United States Patent
Marin et al.

(10) Patent No.: US 6,222,824 B1
(45) Date of Patent: Apr. 24, 2001

(54) STATISTICAL CALL ADMISSION CONTROL

(75) Inventors: Gerald A. Marin, Chapel Hill, NC (US); Xiaowen Mang, Metuchen, NJ (US); Erol Gelenbe, Durham; Raif O. Onvural, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/066,201

(22) Filed: Apr. 24, 1998

(51) Int. Cl.$^7$ .............................. H04J 3/14; G06F 7/38; H04M 3/00
(52) U.S. Cl. .................. 370/230; 370/252; 370/395; 370/468
(58) Field of Search .................................. 370/229, 230, 370/235, 236, 238, 252, 254, 389, 395, 468, 477; 709/220, 223, 224, 225, 226; 708/200

(56) References Cited

U.S. PATENT DOCUMENTS

| | | | |
|---|---|---|---|
| 5,166,894 | * 11/1992 | Saito | 370/94.1 |
| 5,267,232 | * 11/1993 | Katsube et al. | 370/17 |
| 5,274,625 | 12/1993 | Derby et al. | 370/17 |
| 5,289,462 | 2/1994 | Ahmadi et al. | 370/60.1 |
| 5,335,222 | * 8/1994 | Kamoi et al. | 370/60 |
| 5,347,511 | 9/1994 | Gun | 370/54 |
| 5,359,593 | 10/1994 | Derby et al. | 370/17 |
| 5,434,848 | 7/1995 | Chimento, Jr. et al. | 370/17 |
| 5,850,385 | * 12/1998 | Esaki | 370/216 |
| 5,914,936 | * 6/1999 | Hatono et al. | 370/230 |
| 6,041,039 | * 3/2000 | Kilkki et al. | 370/230 |
| 6,067,287 | * 5/2000 | Chung-Ju et al. | 370/232 |
| 6,134,239 | * 10/2000 | Heinanen et al. | 370/412 |

OTHER PUBLICATIONS

Gelenbe, et al., Diffusion based statistical call admission control in ATM, *Performance Evaluation*, vol. 27 & 28, pp. 411–436 (Elsevier Science B.V., 1996).

Rege, Kiran, Equivalent Bandwidth and Related Admission Criteria for ATM Systems—A Performance Study, *International Journal of Communication Systems*, vol. 7, pp. 181–197 (John Wiley & Sons, 1994).

Guerin, Roch, Equivalent Capacity and Its Application to Bandwidth Allocation in High–Speed Networks, *IEEE Journal on Selected Areas in Communications*, vol. 9, No. 4, pp. 968–981 (Sep. 1991).

(List continued on next page.)

Primary Examiner—Alpus H. Hsu
(74) Attorney, Agent, or Firm—Timothy J. Sullivan; Myers, Bigel, Sibley & Sajovec

(57) ABSTRACT

Methods, systems and computer program products are provided for evaluating requests for a network connection combining the requested network connection with existing connections so as to provide a representation of the total network connections and accepting the request for a network connection if sufficient resources are available to accept the request for a network connection based upon the representation of the total network connections. Particular embodiments of the present invention determine if sufficient resources are available to accept the request for a network connection based upon diffusion based representations of the existing network connections and the requested network connection and accepting the request for a network connection if sufficient resources are available to accept the request for a network connection. The diffusion based representation may be used to determine the capacity required for existing connections and the requested connection based upon a predefined maximum loss ratio (L).

42 Claims, 3 Drawing Sheets

OTHER PUBLICATIONS

Feldmeier, David, A Framework of Architectural Concepts for High–Speed Communication Systems, *IEEE Journal on Selected Areas in Communications*, vol. 11, No. 4, pp. 480–488 (May 1993).

Guerin, et al., A Unified Approach to Bandwidth Allocation and Access Control in Fast Packet–Switched Networks, *INFOCOM '92*, pp. 1A.1.1–1A.1.12 (1992).

Gelenbe, Erol, Probabilistic Models of Computer Systems, Part II: Diffusion Approximations, Waiting Times and Batch Arrivals, *Acta Informatica*, vol. 12, pp. 285–303 (1979).

Gelenbe, et al., The Behavior of a Single Queue in a General Network, *Acta Informatica* vol. 7, pp. 123–126 (1976).

Gelenbe, Erol, On Approximate Computer System Models, *Journal of the Association for Computing Machinery*, vol. 22, No. 2, pp. 261–269 (Apr. 1975).

Kobayashi, H., Application of the Diffusion Approximation to Queuing Networks, I: Equilibrium Queue Distributions, *Journal of the Association for Computer Machinery*, vol. 21, No. 2. [[/ 316=328 (Apr. 1974).

Kobayashi, H., Application of the Diffusion Approximation to Queuing Networks II: Nonequilibrium Distributions and Applications to Computer Modeling, *Journal of the Associationi for Computing Machinery*, vol. 21, No. 3, pp. 459–469 (Jul. 1974).

\* cited by examiner

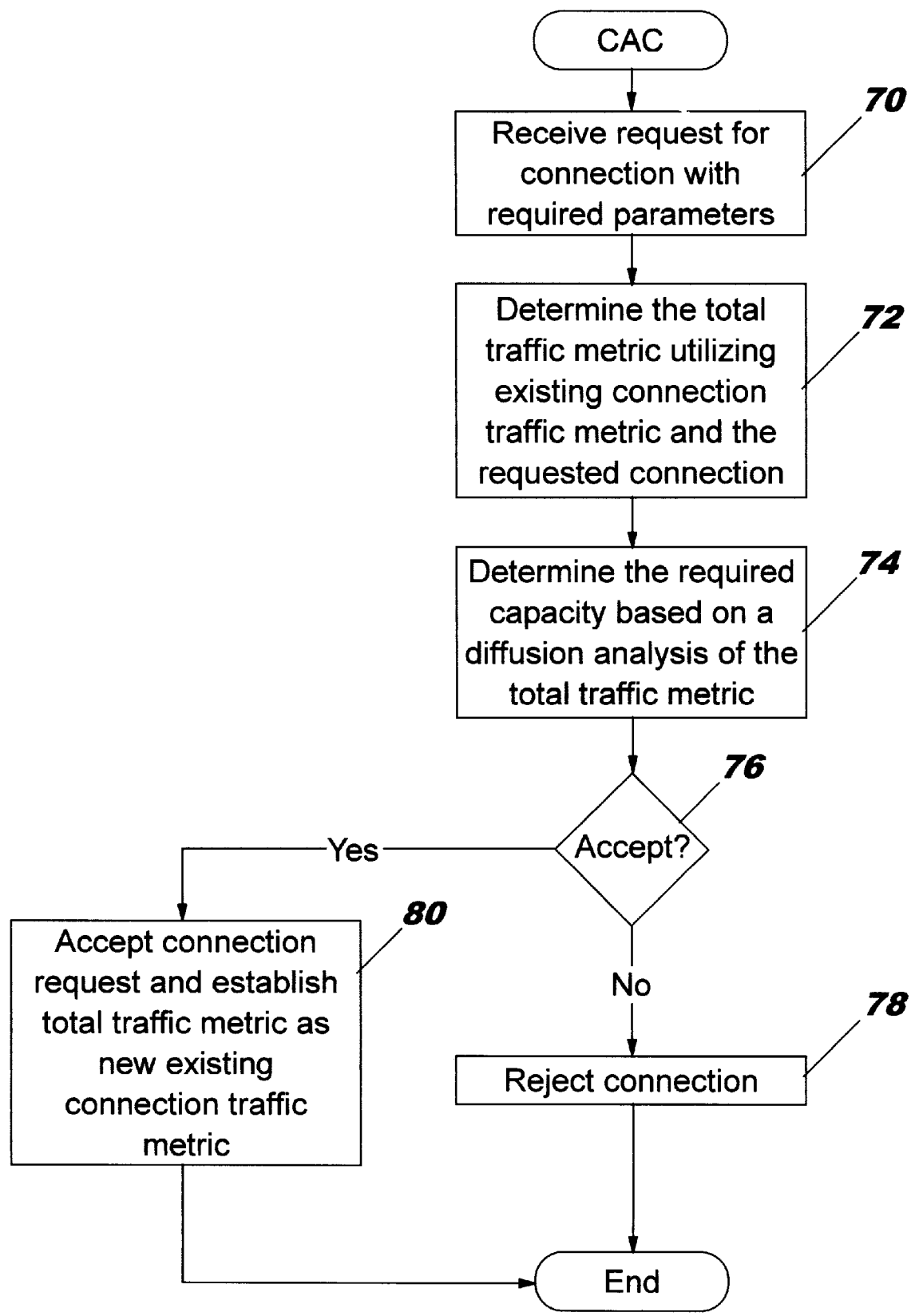

STATISTICAL CALL ADMISSION CONTROL

RELATED APPLICATIONS

This application is related to and claims priority from U.S. Provisional Patent Application Ser. No. 60/044,105 filed Apr. 24, 1997 and entitled STATISTICAL BANDWIDTH ALLOCATION IN ATM NETWORKS.

FIELD OF THE INVENTION

The present invention relates generally to communications networks and more particularly to communications networks using Asynchronous Transfer Mode (ATM).

BACKGROUND OF THE INVENTION

Asynchronous Transfer Mode (ATM) networks have become increasingly popular for both wide area networks and local area networks. In an ATM network all information is transported through the network in relatively short blocks called cells. Information flow through the network is along paths called virtual channels which are set up using a series of tables implemented in switching nodes that comprise the network. Cells on a particular virtual channel follow the same path through the network and are delivered to the destination in the order in which they are received.

When communications are initiated in an ATM network a request is made for a connection. As part of the connection request, the quality of service (QoS) of the request is specified by the requestor. Quality of service characteristics which may be specified in ATM include cell transfer delay (network latency), cell delay variation (jitter), cell transfer capacity (average and peak allowed rates), cell error ratio, cell loss ratio and cell misinsertion ratio. These QoS parameters may be used by the ATM nodes to determine the route of the connection and in determining allowable node utilization.

Routing in an ATM network is performed by an ATM node which attempts to find a feasible route for a virtual connection from a source to a destination. An ATM connection is not set up unless and until the network determines that there is sufficient capacity for the new connection. This determination is based upon the characteristics of the network, the existing traffic on the network and the requested QoS for the connection. If the requested QoS cannot be provided then the requested connection is not accepted. The function in ATM which determines whether a connection request is accepted is referred to as call admission control (CAC).

In ATM, the CAC function is typically carried out at two places; the entry point into the ATM network and at each node in the connection path. At the entry point into the ATM network the CAC function determines a feasible route for the connection request based on the QoS requested, and either accepts or rejects the request based on this determination. To perform the entry point CAC function, the entry point should have available information about the current utilization of the other nodes in the ATM network. This information may then be utilized to determine if the nodes along the selected route can satisfy the QoS requirements of the requested connection.

At each node in a connection route, a local CAC function determines if the node will accept the connection request. This CAC function utilizes the requested QoS and information about the existing connections through the node to determine if the requested QoS level may be achieved. If so, the connection request is accepted.

As is apparent from the above discussion, the call acceptance procedure of an ATM system may impact on the performance of the network. If too many connection requests are accepted then the QoS of the connections may be degraded and additional, possibly costly, resources may be required to handle the network's traffic. If too few connection requests are accepted, then the network will be under-utilized. The call admission problem is further complicated by the fact that the call admission procedure is typically carried out in real-time as call requests are received. The limits placed on the complexity of the call admission procedure by the real-time requirement may potentially result in compromises resulting in either too conservative a call admission procedure or too optimistic a procedure. Finally, the call admission problem is also limited by the information available to determine the characteristics of traffic through the network.

If the network makes a decision to admit a new connection, resources such as link bandwidth and buffers must be reserved to guarantee that the connection receives its guaranteed QoS. For certain types of traffic with well-known characteristics (such as voice traffic) it is straightforward to determine the amount of bandwidth needed to guarantee QoS. Where traffic is more variable (bursty), however, the network must make a more difficult decision regarding the appropriate level of bandwidth resources to set aside for the new connection. The equivalent bandwidth of a connection is defined as an "average" (or steady-state) amount of bandwidth needed to be reserved to carry the traffic of that connection when it is sharing link resources with other connections that have been similarly accommodated. CAC mechanisms based on equivalent bandwidth are typically simple in that the determination of whether a given set of connections can be accommodated without violating their QoS requirements reduces to comparing the sum of the equivalent bandwidths of individual sources to the link capacity.

Although generally simple to implement, equivalent bandwidth CAC functions are highly conservative when the buffer size is small or moderate. Thus, utilization of an equivalent bandwidth approach to call admission may result in fewer connection requests being accepted than could be accommodated by an ATM network or link in an ATM network. Accordingly, additional resources in the network may be required to handle the network traffic than would otherwise be needed if the network resources were more efficiently utilized.

A second approach to call admission control based on bandwidth is the Gaussian approximation based on a zero-buffer assumption. If the number of sources being multiplexed (N) is sufficiently large, the aggregate traffic can be approximated by a Gaussian process with mean rate $$\lambda = \sum_{u=1}^{N} \lambda_u$$

and variance $$\sigma^2 = \sum_{u=1}^{N} \sigma_u^2.$$

While call admission based on a Gaussian process may provide increased efficiency over an equivalent bandwidth approach, in a system having a buffer, the buffer's capacity to absorb traffic bursts is ignored, thus, resulting in underutilization of the network. Furthermore, when N is small, the Gaussian approximation will not be valid which may result in extremely conservative bandwidth determinations.

Various other hybrid systems have also been proposed, however, these systems may also have limitations. For example, a system utilizing a highly non-linear function of the individual equivalent bandwidths to determine the admissibility of a given set of traffic sources may be overoptimistic in certain situations, thus, resulting in higher cell loss ratios than the specified QoS of the connections.

In light of the above discussion, a need exists for improvements in the mechanisms for accepting connections in ATM and other networks.

SUMMARY OF THE INVENTION

In view of the above discussion, it is an object of the present invention to provide for call acceptance which can efficiently utilize network resources.

A further object of the present invention is to provide a call admission procedure which may be carried out in real time.

Still another object of the present invention is to provide a call admission procedure which is not overly optimistic in accepting connection requests.

These and other objects of the present invention are provided by methods, systems and computer program products for evaluating requests for a network connection combining the requested network connection with existing connections so as to provide a representation of the total network connections and accepting the request for a network connection if sufficient resources are available. Particular embodiments of the present invention determine if sufficient resources are available to accept the request for a network connection based upon diffusion based representations of the existing network connections and the requested network connection. The diffusion based representation may be used to determine the capacity required for existing connections and the requested connection based upon a predefined maximum loss ratio (L). In particular embodiments of the present invention, a diffusion based representation of the network resources required by the existing network connections and the requested network connection is generated.

By utilizing a diffusion based representation of network traffic, increased efficiency in the acceptance procedure may be achieved. The use of the diffusion approximation may more accurately reflect actual bandwidth usage of connections thus allowing for more accurate determinations of the impact of an additional connection on the total traffic. Use of the diffusion approximation conservatively estimates required bandwidth so as to assure that the service requirements of existing connections are maintained. However, the diffusion approximation can also allow more connections to be established than would be established using conventional techniques. Furthermore, the diffusion based representation is not so complex as to preclude real-time implementation.

In one embodiment of the present invention, a diffusion based representation of the network resources required by the existing network connections and the requested network connection is achieved by summing an arrival rate of each existing connection and the arrival rate of the requested network connection to provide a total arrival rate ($\lambda$), summing a variance of arrival rate of each existing connection and the variance of arrival rate of the requested network connection to provide a total variance ($\sigma^2$), and summing an instantaneous variance of the change of the buffer occupancy for each existing connection so as to provide a total instantaneous variance ($\alpha$). The link capacity required by the existing network connections and the requested network connection is then determined based on the total arrival rate, the total variance and the total instantaneous variance.

In another embodiment of the present invention, the total instantaneous variance may be determined by summing a squared coefficient of variation of the incoming traffic of each existing connection and the squared coefficient of variation of the requested network connection to provide a total squared coefficient of variation ($c^2$). In such a case determination of the link capacity required by the existing network connections and the requested network connection may be based on the total arrival rate, the total variance and the total squared coefficient of variation.

In particular embodiments, where the network is characterized by a maximum bandwidth (B) and a cell loss ratio (L) the capacity ($C^*$) required by the existing connections and the requested connection may be determined by evaluating:

$$C^* = \lambda - \beta + \sqrt{\beta^2 - 2\sigma^2 \omega_1}$$

where $$\beta = \frac{2B}{\alpha}\sigma^2$$

and where $\omega_1 = \ln(L\sqrt{2\pi})$. Alternatively, the required capacity $C^*$ may be determined by by evaluating:

$$C^* = \lambda - \beta + \sqrt{\beta^2 - 2\sigma^2 \omega_2}$$

where $$\beta = \frac{2B}{\alpha}\sigma^2$$

and where $\omega_2 = \ln(L\lambda\sqrt{2\pi}) - \ln(\sigma)$. In either case, $\alpha$ may be specified as $\alpha = \lambda c^2$.

Preferably, the network comprises an ATM network having a plurality of ATM nodes. In an ATM network, the present invention may be utilized for all CAC functions. Thus, the present invention may make an acceptance determination for a single node or for each node in the ATM network in a path through the network associated with the requested network connection.

As will be appreciated by those of skill in the art, the present invention may be embodied as methods, apparatus or computer program products.

BRIEF DESCRIPTION OF THE DRAWINGS

FIG. 3 is a flowchart illustrating the operation of the present invention in a CAC function.

DETAILED DESCRIPTION OF THE INVENTION

Figure 1:
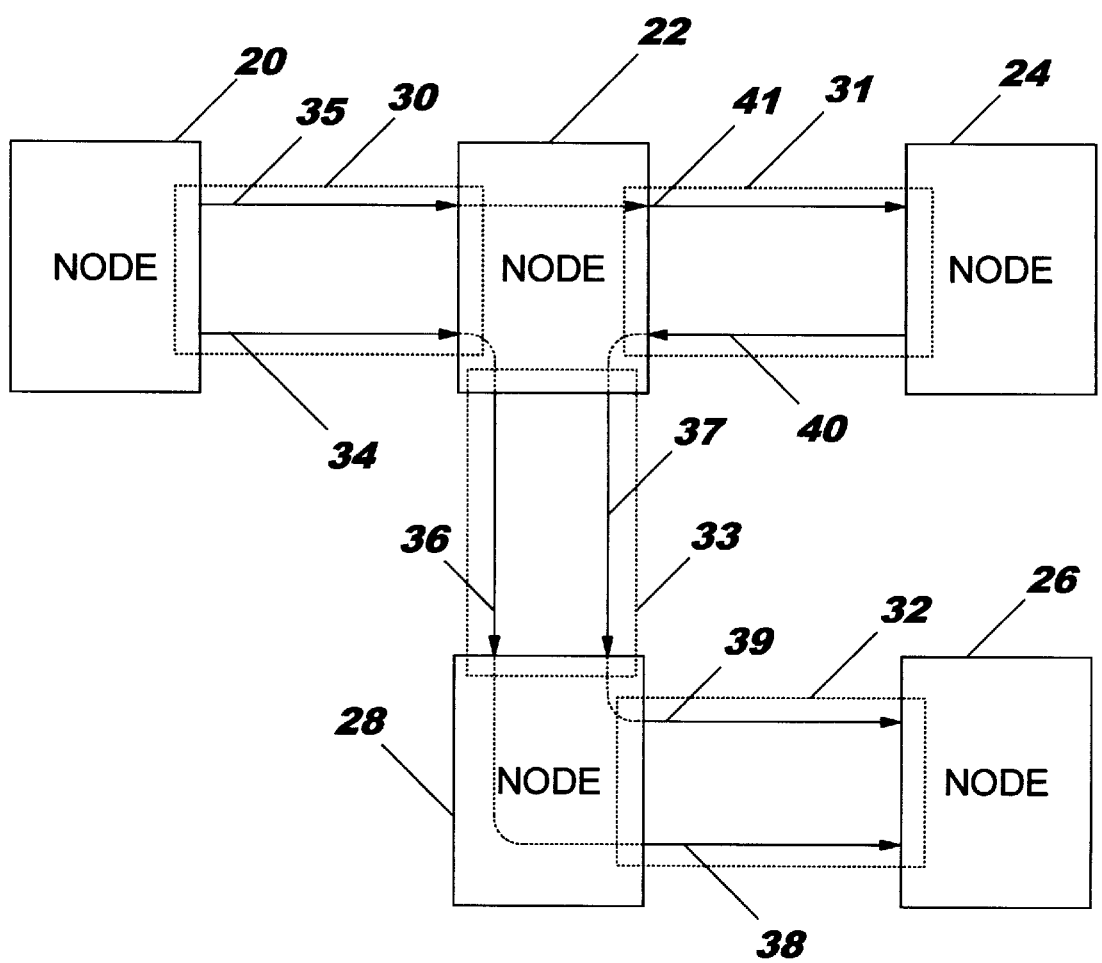
FIG. 1 is a block diagram schematically illustrating an ATM network utilizing the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of the present invention are illustrated herein in flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

The present invention utilizes a diffusion based statistical call admission procedure. Preferably, the present invention is utilized in an ATM multiplexer where cells from different connections are interleaved at a transmission buffer and served in a first-come-first-serve manner. Details of such as system, while not essential to an understanding of the present invention, may be found in U.S. patent application Ser. No. 08/968,201 entitled SYSTEMS, METHODS AND COMPUTER PROGRAM PRODUCTS FOR CONTROLLING EARLIEST DEADLINE FIRST SCHEDULING AT ATM NODES.

Utilizing the diffusion based statistical analysis of traffic, whether an acceptable cell loss ratio will result if an additional connection is added to the traffic may be determined. Thus, based on a predefined acceptable cell loss ratio, a determination may be made as to whether to accept a new connection or to reject the connection.

As an example of a diffusion based representation, ATM traffic may be characterized by the following three equations:

$$f(x,t)dx:Pr\{x \leq X(t) < x+dx\},$$

$$m(t):Pr\{X(t)=0\},$$

and $$M(t):Pr\{X(t)=B\}$$

where $X(t)$ is a random variable denoting buffer size at time t, and B is the total buffer size. In the steady state (as t goes to infinity), dropping the dependency on t results in the following:

$$-\frac{\partial}{\partial x}f(x) + \frac{\alpha}{2}\frac{\partial^2}{\partial x^2}f(x) + \frac{m}{E[h]}\delta(x-1) + \frac{M}{E[H]}\delta(x-B+1) = 0 \quad (1)$$

$$\lim_{x \to 0^+}\left[-\mu f(x) + \frac{\alpha}{2}\frac{\partial}{\partial x}f(x)\right] = \frac{m}{E[h]} \quad (2)$$

$$\lim_{x \to B^+}\left[-\mu f(x) + \frac{\alpha}{2}\frac{\partial}{\partial x}f(x)\right] = \frac{M}{E[H]} \quad (3)$$

$$m + M + \int_{0^+}^{B^-} f(x)dx = 1$$

where $\delta(x)$ is the Dirac Delta function, h is a random variable denoting the distribution of idle period in the queue with expected value $E[h]$, H is a random variable denoting the distribution of time the buffer is full with expected value $E[H]$, and $\mu$ is the instantaneous average rate of change of the buffer occupancy which may be determined by the mean aggregate cell arrival rate to the buffer ($\lambda$) minus the transmission capacity of the lin (C), ie. $\mu=\lambda-C$.

Equation (1) represents the stationary behavior for the motion of the queue length process in the interval ]0,B[ and the effects of jumps from 0 and B into the interval. Equation (2) corresponds to the depletion of the probability mass m at the lower boundary (i.e. when the queue is empty) due to jumps to having one cell in the queu and the flow of probability mass from inside the interval ]0,B[ towards the lower boundary. Similarly, equation (3) represents the depletion of the probability mass M at the higher boundary (i.e. when the queue is full) due to jumps to having B−1 cells in the queue and the flow of probability mass from inside the interval ]0,B[ towards the higher boundary.

Using equations (1), (2) and (3), two equations may be derived to approximate cell loss ratio in an ATM'multiplexer. These two equations are a finite buffer approximation ($L_{FB}$) and an infinite buffer approx ($L_{IB}$). The equations are as follows:

$$L_{FB} = \psi e^{\frac{2(B-1)}{\alpha}\mu} Pr\{R(t) \geq C\} \quad (4)$$

$$L_{IB} = \gamma e^{\frac{2B}{\alpha}\mu} \frac{E[(R(t) \geq C)^+]}{\lambda} \quad (5)$$

where $$\psi = \frac{-\mu E[H]}{(1 - \mu E[h]) - (1 + \mu E[H])e^{\frac{2(B-1)}{\alpha}\mu}}$$

and where $$\gamma = \frac{1}{1 - \mu E[h]} \left[1 - e^{\frac{2\mu}{\alpha}}\right] \frac{\alpha}{2\mu} \text{ with } R(t)$$

denoting the instantaneous cell arrival rate at time t.

These approximations may be used in the call admission control procedure to determine whether or not a new connection request can be accepted if there are N connections already established and N is great than or equal to 0. Either equation (4) or equation (5) may be used to provide the cell loss ratio when there are N connections multiplexed on a link with transmission capacity C. The amount of bandwidth required to support a new connection request when there are N connections already established at the link is equivalent to determining he minimum value of C so that the right hand side of equation (4) or equation (5) is lee than or equal to the desired cell loss ratio.

Considering that call admission decisions are required to be performed in real time and that equations (4) and (5) do not yield a closed form solution for C, a conservative approximation to estimate the value of C may De derived as follows for the finite buffer case (CFB):

$$C_{FB} = \lambda - \beta + \sqrt{\beta^2 - 2\sigma^2 \omega_1} \quad (6)$$

where $$\beta = \frac{2B}{\alpha}\sigma^2$$

and where $\omega_1 = \ln(L\sqrt{2\pi})$ for a desired cell loss ratio of L.

Similarly, for the infinite buffer case a conservative approximation to estimate the value of C ($C_{IB}$) may be derived as follows:

$$C_{IB} = \lambda - \beta + \sqrt{\beta^2 - 2\sigma^2 \omega_2} \quad (7)$$

where $\omega_2 = \ln(L\lambda\sqrt{2\pi}) - \ln(\sigma)$.

A new connection is established if there is enough bandwidth to accommodate the connection. Either equation (6) or equation (7) may be determined for the total connections (i.e. the existing connections and the new connection) and if the required capacity is less than the capacity of the link, then the connection request is accepted.

The above description generally describes the development of a diffusion based representation of the network traffic which may be used in the call admission control procedure. As used herein, diffusion based representation is used to refer to representation of the network traffic based on a diffusion approximation of the traffic. A diffusion approximation, typically, approximates a discrete process with a continuous process based on the central limit theorem. The diffusion approximation results in the new connection request being combined with existing requests so as to provide a representation of the network connections which incorporates the requested connection and the existing connections.

A specific implementation of the present invention will now be described with reference to FIGS. 1 through 3. FIG. 1 illustrates a network utilizing ATM nodes according to the present invention. As seen in FIG. 1, a number of ATM nodes 20, 22, 24, 26 and 28, are interconnected via physical links 30, 31, 32 and 33. The physical links provide for communication between the nodes and allow for the interconnection of source and destination ATM nodes via an end-to-end virtual circuit formed by interconnected, but separate inter-node segments. FIG. 1 are illustrated a number of such segments 34, 35, 36, 37, 38, 39, 40 and 41.

As an example of a path between nodes 20 and 26, a virtual circuit between the two nodes may be "constructed" from logical connection 34 over physical link 30. logical connection 36 over physical link 33, and logical connection 38 over physical link 32 to node 26.

As will be appreciated by those of skill in the art, the nodes of FIG. 1 may be ATM endpoint nodes, ATM switches, user network interface nodes or other processing systems utilizing the ATM communication protocols. Thus, the present invention is not limited to use in ATM switches but may be utilized in any devices complying with ATM standards. Furthermore, while the network of FIG. 1 has been described as an ATM network, as will be appreciated by those of skill in the art, the network may be any packet based network utilizing a call admission procedure where sufficient information is available to utilize the diffusion based statistical call admission procedure of the present invention.

When a request by a user to access the ATM network of FIG. 1 is made, for example, to node 20, the node evaluates whether the quality of service parameters of the request may be met by a route through the ATM network before the connection request is accepted. Thus, for example, if a request is made for a connection between node 20 and node 24, node 20 would evaluate the status of connections at node 20, node 22, and node 24 to determine whether to accept the request. Thus, node 20 will typically have information regarding the connections which already exist through node 22 and node 24. The CAC function of node 20 will then determine whether the request may be accepted utilizing the diffusion based call admission control of the present invention to evaluate whether each node in the connection path may accept the connection request.

Figure 2:
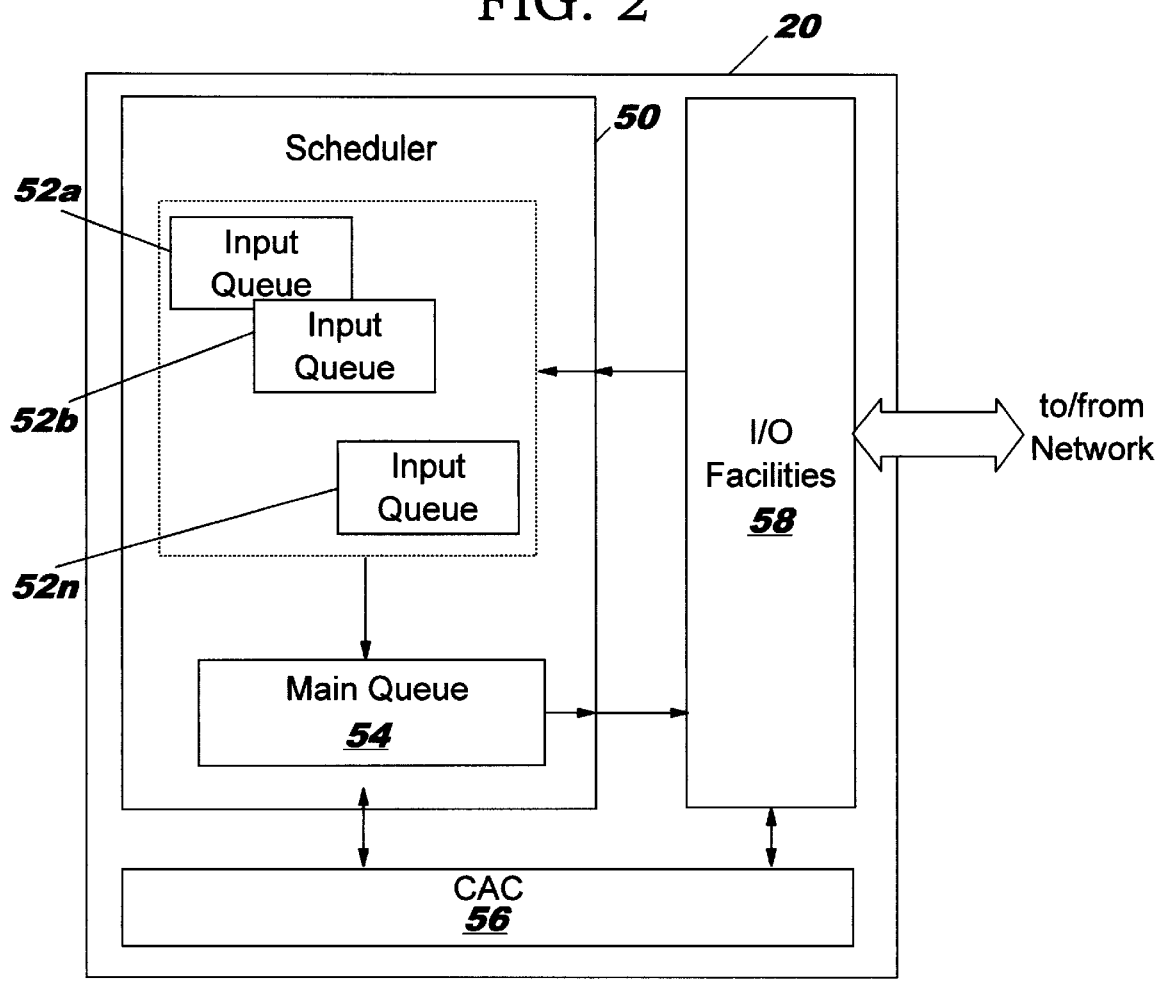
FIG. 2 is a block diagram of an ATM device according to the present invention.

FIG. 2 illustrates one embodiment of an ATM node according to the present invention. As seen in FIG. 2, an ATM node according to the present invention may include a scheduler 50, input queues 52a, 52b through 52n, a main queue 54, a CAC function 56 and input/output capabilities 58. Cells are received and transmitted through the node by the input/output facilities 58. Received cells are placed in the appropriate input queue 52a through 52n by the scheduler 50. Cells that are to be output are moved by the scheduler 50 from the input queues to the main queue 54 for transmission. The CAC function 56 according to the present invention determines whether requests for connections to the node will be accepted (the ACAC function) utilizing the diffusion based call admission control procedure described herein. The CAC 56 also determines a feasible route for connection requests received by the node when the node serves as an entry point to the ATM network.

The present invention is described with respect to the nodes and networks of FIG. 1 and FIG. 2; however, as will be appreciated by those of skill in the art, the present invention is applicable to any network configuration where call acceptance is performed. Furthermore, the functions of the present invention may be implemented utilizing a data processing system operating under software control, as dedicated hardware or a combination of the two.

FIG. 3 illustrates one embodiment of the present invention. As is seen in that figure, the CAC function begins when a request is received by an ATM node for a connection (block 70). For example, a request for a connection may be received at node 20 in FIG. 1 which may be an ATM device such as is illustrated in FIG. 2. The request will include parameters which define the characteristics of the requested connection. For example, the request may contain information regarding packet arrival rates (i.e. mean aggregate cell arrival rate $\lambda$), variance in packet arrival rate ($\sigma^2$) and the instantaneous variance of the change of the buffer occupancy ($\alpha$) or such information from which this information could be derived. For example, the instantaneous variance of the change of the buffer occupancy may be determined by $\alpha = \lambda^3 V_a + C^3 V_s$ where $V_a$ is the variance of the interarrival time, $V_s$ is the variance of service time and C is the transmission capacity of the link. Alternatively, for a specific connection, the instantaneous variance of the change of the buffer occupancy for the connection may be based on a model of the connection. For example, for an "on-off" connection, $\alpha = \lambda c^2$ may be utilized where $c^2$ is the squared coefficient of variation of the incoming traffic from the connection.

After the connection request is received, a total trffic metric is determined based on traffic parameters of the existing connections and the requested connection (block 72). The traffic metric may be determined by adding the traffic metric for the requested connection to the traffic metric for the existing connections. Thus, for example. an existing traffic metric I for the existing connections may be expressed as $$I = \left\{ \sum_{u=1}^{N} \lambda_u, \sum_{u=1}^{N} \sigma_u^2, \sum_{u=1}^{N} \alpha_u \right\}.$$

Similarly, the traffic metric U for the requested connection may be expressed as $$U = \{\lambda_u, \sigma_u^2, \alpha_u\}.$$

Thus the total traffic metric T may be expressed as T=I+U. As will be appreciated by those of skill in the art in light of the above discussion, the information to produce the total traffic metric may be based on traffic models or on measurements of traffic parameters or a combination of the two wherein for certain connections the parameters are derived from models and for other connections the parameters are empirically derived from traffic measurements. If, for example, the parameters are based on a traffic model, then $\alpha$ may be expressed as $\alpha = \lambda c^2$ which would result in I being defined as $$I = \left\{ \sum_{u=1}^{N} \lambda_u, \sum_{u=1}^{N} \sigma_u^2, \sum_{u=1}^{N} \lambda_u c_u^2 \right\}.$$

U may then be defined as $$U = \{\lambda_u, \sigma_u^2, c_u^2\}$$

from which the total traffic metric T may be determined. While the present invention has been described with reference to two methods of determining parameters of the traffic metric for a connection, as will be appreciated by one of skill in the art, various other ways may be utilized to determine values of the parameters of the traffic metric for a connection or requested connection.

After the total traffic metric is determined, this information is then used to calculated a required capacity (C*) based on the parameters of T. C* may be determined utilizing equation (6), equation (7) or both. Thus, in block 74 the ATM node determines one or both of the following:

$$C_{FB}^* = \lambda - \beta + \sqrt{\beta^2 - 2\sigma^{2\omega_1}} \text{ or } C_{IB}^* 32\ \lambda - \beta + \sqrt{\beta^2 - 2\sigma^{2\omega_2}}$$

where $$\beta = \frac{2B}{\alpha} \sigma^2,$$

where $\omega_1 = \ln(L\sqrt{2\pi})$ and where $\omega_2 = \ln(L\lambda\sqrt{2\pi}) - \ln(\pi)$ for the cell loss ratio (L) specified for the network and utilizing the parameters from the total traffic metric T described above. As is described above, $\alpha$ may vary depending on the particular implementation and may be $\alpha = \lambda^3 V_a + C^3 V_s$ or may be $\alpha = \lambda c^2$.

Once C* is determined for the total traffic metric, it is determined if the requested connection will be accepted (block 76). This determination may be made by comparing C* with the capacity of the link (C). If C* is greater than C then the connection request is not accepted and if C* is less than or equal to C then the connection is accepted. Alternatively, in a more conservative approach, if C* is greater than or equal to C then the connection request is not accepted and if C* is less than C then the connection is accepted. If both equations are utilized then the comparison of C* with C for both results may be made in which case both of the results may be used in determining if the connection request should be accepted.

If the connection is accepted, then conventional procedures are utilized to accept the connection and the existing traffic metric I is set to the total traffic metric T to reflect the new connection (block 80). If the connection is rejected then the conventional procedure for rejection of a connection is carried out (block 78). In such a case, the existing traffic metric I remains unchanged.

While the present invention has been described with respect to a particular series of operations in a CAC function, as will be appreciated by those of skill in the art other series of operations could be utilized while still benefiting from the teachings of the present invention. Furthermore, as will be appreciated by those of skill in the art, the present invention may be applicable to networks other than ATM networks so as to achieve the benefits and advantages of the present invention in networks other than ATM networks. The invention may advantageously be used in any network that sets aside resources to support QoS for connections in part through implementation of admission control processes.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of evaluating requests for a network connection, the method comprising the steps of:
    determining if an acceptable cell loss ratio results from a requested network connection being added to network traffic utilizing a diffusion based statistical analysis of the network traffic; and
    accepting the request for a network connection if an acceptable cell loss ratio results from a requested network connection being added to the network traffic based on the diffusion based statistical analysis.

2. A method according to claim 1, wherein said step of determining comprises the step of generating a diffusion based representation of the network traffic for a predefined maximum acceptable cell loss ratio resulting from the existing network connections and the requested network connection; and
    wherein said step of accepting comprises the step of accepting the request for network access if the diffusion based representation of the network traffic for the existing network connections and the requested network connection is less than the capacity of the network.

3. A method according to claim 2, wherein said generating step generates a diffusion based representation of the capacity required for existing connections and the requested connections.

4. A method of evaluating requests for a network connection, the method comprising the steps of:
    determining if sufficient network capacity is available to accept the request for a network connection based upon diffusion based representations of network capacity for the existing network connections and the requested network connection; and
    accepting the request for a network connection if sufficient network capacity is available to accept the request for a network connection based upon the diffusion based representation of the existing network connections and the requested network connection.

5. A method according to claim 4, wherein said determining step determines the capacity required for existing connections and the requested connections based upon a cell loss ratio (L).

6. A method according to claim 4, wherein said step of determining comprises the step of generating a diffusion based representation of the network capacity required by the existing network connections and the requested network connection; and
    wherein said step of accepting comprises the step of accepting the request for network access if the diffusion based representation of the network capacity required by the existing network connections and the requested network connection is less than the capacity of the network.

7. A method of determining whether to accept a request for a network connection, the method comprising the steps of:
    summing an arrival rate of each existing connection and the arrival rate of a requested network connection corresponding to the request for a network connection to provide a total arrival rate ($\lambda$);
    summing a variance of arrival rate of each existing connection and the variance of arrival rate of the requested network connection to provide a total variance ($\sigma^2$);
    summing an instantaneous variance of a change of the buffer occupancy for each existing connection so as to provide a total instantaneous variance ($\alpha$);
    determining a link capacity required by the existing network connections and the requested network connection based on the total arrival rate, the total variance and the total instantaneous variance; and
    accepting the request for a network connection if a link capacity of a network node is at least as great as the determined link capacity required by the existing network connections and the requested network connection based on the total arrival rate, the total variance and the total instantaneous variance.

8. A method according to claim 7, wherein said step of summing an instantaneous variance of the change of buffer occupancy comprises the step of summing a squared coefficient of variation of the incoming traffic of each existing connection and the squared coefficient of variation of the requested network connection to provide a total squared coefficient of variation ($c^2$); and
    wherein said step of determining the link capacity required by the existing network connections and the requested network connection based on the total arrival rate, the total variance and the total instantaneous variance comprises the step of determining the link capacity required by the existing network connections and the requested network connection based on the total arrival rate, the total variance and the total squared coefficient of variation.

9. A method according to claim 7, wherein the network is characterized by a maximum bandwidth (B) and a cell loss ratio (L) and wherein said determining step comprises the step of determining capacity ($C^*$) by evaluating:

$$C^* = \lambda - \beta + \sqrt{\beta^2 - 2\sigma^2 \omega_1}$$

where $$\beta = \frac{2B}{\alpha}\sigma^2$$

and where $\omega_1 = \ln(L\sqrt{2\pi})$.

10. A method according to claim 9, wherein said step of summing an instantaneous variance of the change of buffer occupancy comprises the step of summing a squared coefficient of variation of the incoming traffic of each existing connection and the squared coefficient of variation of the requested network connection to provide a total squared coefficient of variation ($c^2$); and
    wherein $\alpha = \lambda c^2$.

11. A method according to claim 7, wherein the network is characterized by a maximum bandwidth (B) and a cell loss ratio (L) and wherein said determining step comprises the step of determining capacity (C) by evaluating:

$$C^* = \lambda - \beta + \sqrt{\beta^2 - 2\sigma^2 \omega_2}$$

where $$\beta = \frac{2B}{\alpha} \sigma^2$$

and where $\omega_2 = \ln(L\lambda\sqrt{2\pi}) - \ln(\sigma)$.

12. A method according to claim 11, wherein said step of summing an instantaneous variance of the change of buffer occupancy comprises the step of summing a squared coefficient of variation of the incoming traffic of each existing connection and the squared coefficient of variation of the requested network connection to provide a total squared coefficient of variation ($c^2$); and wherein $\alpha = \lambda c^2$.

13. A method according to claim 4, wherein the network comprises an ATM network having a plurality of ATM nodes.

14. A method according to claim 13, wherein said determining step is carried out for each node in the ATM network in a path through the network associated with the requested network connection.

15. A system for evaluating requests for a network connection, comprising:

means for determining if an acceptable cell loss ratio results from a requested network connection being added to network traffic utilizing a diffusion based statistical analysis of the network traffic; and means for accepting the request for a network connection if an acceptable cell loss ratio results from a requested network connection being added to the network traffic based on the diffusion based statistical analysis.

16. A system according to claim 15, wherein said means for determining comprises means for generating a diffusion based representation of the network traffic for a predefined maximum acceptable cell loss ratio resulting from the existing network connections and the requested network connection; and wherein said means for accepting comprises means for accepting the request for network access if the diffusion based representation of the network traffic for the existing network connections and the requested network connection is less than the capacity of the network.

17. A system according to claim 16, wherein said means for generating generates a diffusion based representation of the capacity required for existing connections and the requested connections.

18. A system for evaluating requests for a network connection, comprising:

means for determining if sufficient network capacity is available to accept the request for a network connection based upon diffusion based representations of network capacity for the existing network connections and the requested network connection; and means for accepting the request for a network connection if sufficient network capacity is available to accept the request for a network connection based upon the diffusion based representation of the existing network connections and the requested network connection.

19. A system according to claim 18, wherein said means for determining determines the capacity required for existing connections and the requested connections based upon a cell loss ratio (L).

20. A system according to claim 18, wherein means for determining comprises means for generating a diffusion based representation of the network capacity required by the existing network connections and the requested network connection; and wherein said means for accepting comprises means for accepting the request for network access if the diffusion based representation of the network capacity required by the existing network connections and the requested network connection is less than the capacity of the network.

21. A system for determining whether to accept a request for a network connection, comprising:

means for summing an arrival rate of each existing connection and the arrival rate of a requested network connection corresponding to the request for a network connection to provide a total arrival rate ($\lambda$);

means for summing a variance of arrival rate of each existing connection and the variance of arrival rate of the requested network connection to provide a total variance ($\sigma^2$);

means for summing an instantaneous variance of the change of the buffer occupancy for each existing connection so as to provide a total instantaneous variance ($\alpha$);

means for determining the link capacity required by the existing network connections and the requested network connection based on the total arrival rate, the total variance and the total instantaneous variance; and means for accepting the request for a network connection if a link capacity of a network node is at least as great as the determined link capacity required by the existing network connections and the requested network connection based on the total arrival rate, the total variance and the total instantaneous variance.

22. A system according to claim 21, wherein said means for summing an instantaneous variance of the change of buffer occupancy comprises means for summing a squared coefficient of variation of the incoming traffic of each existing connection and the squared coefficient of variation of the requested network connection to provide a total squared coefficient of variation ($c^2$); and wherein said means for determining the link capacity required by the existing network connections and the requested network connection based on the total arrival rate, the total variance and the total instantaneous variance comprises means for determining the link capacity required by the existing network connections and the requested network connection based on the total arrival rate, the total variance and the total squared coefficient of variation.

23. A system according to claim 21, wherein the network is characterized by a maximum bandwidth (B) and a cell loss ratio (L) and wherein said means for determining comprises means for determining capacity (C*) by evaluating:

$$C^* = \lambda - \beta + \sqrt{\beta^2 - 2\sigma^2 \omega_1}$$

where $$\beta = \frac{2B}{\alpha} \sigma^2$$

and where $\omega_1 = \ln(L\sqrt{2\pi})$.

24. A system according to claim 23, wherein said means for summing an instantaneous variance of the change of buffer occupancy comprises means for summing a squared coefficient of variation of the incoming traffic of each existing connection and the squared coefficient of variation of the requested network connection to provide a total squared coefficient of variation ($c^2$); and wherein $\alpha=\lambda c^2$.

25. A system according to claim 21, wherein the network is characterized by a maximum bandwidth (B) and a cell loss ratio (L) and wherein said means for determining comprises means for determining capacity (C*) by evaluating:

$$C^*=\lambda-\beta+\sqrt{\beta^2-2\sigma^2\omega_1}$$

where $$\beta = \frac{2B}{\alpha}\sigma^2$$

and where $\omega_2=\ln(L\lambda\sqrt{2\pi})-\ln(\sigma)$.

26. A system according to claim 25, wherein said means for summing an instantaneous variance of the change of buffer occupancy comprises means for summing a squared coefficient of variation of the incoming traffic of each existing connection and the squared coefficient of variation of the requested network connection to provide a total squared coefficient of variation ($c^2$); and wherein $\alpha=\lambda c^2$.

27. A system according to claim 18, wherein the network comprises an ATM network having a plurality of ATM nodes.

28. A system according to claim 27, wherein said means for determining makes such determination for each node in the ATM network in a path through the network associated with the requested network connection.

29. A computer program product for evaluating requests for a network connection, comprising:
 a computer-readable storage medium having computer-readable program code means embodied in said medium, said computer-readable program code means comprising:
  computer-readable program code means for determining if an acceptable cell loss ratio results from a requested network connection being added to network traffic utilizing a diffusion based statistical analysis of the network traffic; and
  computer-readable program code means for accepting the request for a network connection if an acceptable cell loss ration results from a requested network connection being added to the network traffic based on the diffusion based statistical analysis.

30. A computer program product according to claim 29, wherein said computer-readable program code means for determining comprises computer-readable program code means for generating a diffusion based representation of the network traffic for a predefined maximum acceptable cell loss ratio resulting from the existing network connections and the requested network connection; and
 wherein said computer-readable program code means for accepting comprises computer-readable program code means for accepting the request for network access if the diffusion based representation of the network traffic for the existing network connections and the requested network connection is less than the capacity of the network.

31. A computer program product according to claim 30, wherein said computer-readable program code means for generating generates a diffusion based representation of the capacity required for existing connections and the requested connections.

32. A computer-program product for evaluating requests for a network connection, comprising:
 a computer-readable storage medium having computer-readable program code means embodied in said medium, said computer-readable program code means comprising:
  computer-readable program code means for determining if sufficient network capacity is available to accept the request for a network connection based upon diffusion based representations of network capacity for the existing network connections and the requested network connection; and
  computer-readable program code means for accepting the request for a network connection if sufficient network capacity is available to accept the request for a network connection based upon the diffusion based representation of the existing network connections and the requested network connection.

33. A computer program product according to claim 32, wherein said computer-readable program code means for determining determines the capacity required for existing connections and the requested connections based upon a cell loss ratio (L).

34. A computer program product according to claim 32, wherein computer-readable program code means for determining comprises computer-readable program code means for generating a diffusion based representation of the network capacity required by the existing network connections and the requested network connection; and
 wherein said computer-readable program code means for accepting comprises computer-readable program code means for accepting the request for network access if the diffusion based representation of the network capacity required by the existing network connections and the requested network connection is less than the capacity of the network.

35. A computer program product for determining whether to accept a request for a network connection, comprising:
 a computer-readable storage medium having computer-readable program code means embodied therein, the computer-readable program code means comprising:
  computer-readable program code means for summing an arrival rate of each existing connection and the arrival rate a requested network connection corresponding to the request for a network connection to provide a total arrival rate ($\lambda$);
  computer-readable program code means for summing a variance of arrival rate of each existing connection and the variance of arrival rate of the requested network connection to provide a total variance ($\sigma^2$);
  computer-readable program code means for summing an instantaneous variance of the change of the buffer occupancy for each existing connection so as to provide a total instantaneous variance ($\alpha$);
  computer-readable program code means for determining the link capacity required by the existing network connections and the requested network connection based on the total arrival rate, the total variance and the total instantaneous variance; and
  computer-readable program code means for accepting the request for a network connection if a link capacity of a network link is at least as great as the determined link capacity required by the existing network connections and the requested network connection based on the total arrival rate, the total variance and the total instantaneous variance.

36. A computer program product according to claim 35, wherein said means for summing an instantaneous variance of the change of buffer occupancy comprises means for summing a squared coefficient of variation of the incoming traffic of each existing connection and the squared coefficient of variation of the requested network connection to provide a total squared coefficient of variation ($c^2$); and wherein said computer-readable program code means for determining the link capacity required by the existing network connections and the requested network connection based on the total arrival rate, the total variance and the total instantaneous variance comprises computer-readable program code means for determining the link capacity required by the existing network connections and the requested network connection based on the total arrival rate, the total variance and the total squared coefficient of variation.

37. A computer program product according to claim 35, wherein the network is characterized by a maximum bandwidth (B) and cell loss ratio (L) and wherein said computer-readable program code means for determining comprises computer-readable program code means for determining capacity (C*) by evaluating:

$$C^* = \lambda - \beta + \sqrt{\beta^2 - 2\sigma^2 \omega_1}$$

where $$\beta = \frac{2B}{\alpha} \sigma^2$$

and where $\omega_1 = \ln(L\sqrt{2\pi})$.

38. A computer program product according to claim 37, wherein said computer readable program code means for summing an instantaneous variance of the change of buffer occupancy comprises computer readable program code means for summing a squared coefficient of variation of the incoming traffic of each existing connection and the squared coefficient of variation of the requested network connection to provide a total squared coefficient of variation ($c^2$); and wherein $\alpha = \lambda c^2$.

39. A computer program product according to claim 35, wherein the network is characterized by a maximum bandwidth (B) and a cell loss ratio (L) and wherein said computer-readable program code means for determining comprises computer-readable program code means for determining capacity (C*) by evaluating:

$$C^* = \lambda - \beta + \sqrt{\beta^2 2 - \sigma^2 \omega_2}$$

where $$\beta = \frac{2B}{\alpha} \sigma^2$$

and where $\omega_2 = \ln(L\lambda\sqrt{2\pi}) - \ln(\sigma)$.

40. A computer program product according to claim 39, wherein said computer readable program code means for summing an instantaneous variance of the change of buffer occupancy comprises computer readable program code means for summing a squared coefficient of variation of the incoming traffic of each existing connection and the squared coefficient of variation of the requested network connection to provide a total squared coefficient of variation ($c^2$); and wherein $\alpha = \lambda c^2$.

41. A computer program product according to claim 32, wherein the network comprises an ATM network having a plurality of ATM nodes.

42. A computer program product according to claim 41, wherein said computer-readable program code means for determining makes such determination for each node in the ATM network in a path through the network associated with the requested network connection.

* * * * *